United States Patent
Kim et al.

(10) Patent No.: US 10,065,864 B2
(45) Date of Patent: Sep. 4, 2018

(54) METHOD OF PREPARING TRICHLOROSILAN

(71) Applicant: HANWHA CHEMICAL CORPORATION, Seoul (KR)

(72) Inventors: Gil Ho Kim, Daejeon (KR); Joon Hwan Kim, Daejeon (KR); Kyu Hak Park, Incheon (KR); Dong Ho Lee, Daejeon (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 0 days.

(21) Appl. No.: 15/318,026

(22) PCT Filed: Jul. 21, 2015

(86) PCT No.: PCT/KR2015/007573
§ 371 (c)(1),
(2) Date: Dec. 12, 2016

(87) PCT Pub. No.: WO2016/013853
PCT Pub. Date: Jan. 28, 2016

(65) Prior Publication Data
US 2017/0137296 A1    May 18, 2017

(30) Foreign Application Priority Data
Jul. 22, 2014 (KR) .......... 10-2014-0092701

(51) Int. Cl.
*C01B 33/107* (2006.01)
*B01J 23/72* (2006.01)
*B01J 23/755* (2006.01)
*C01B 33/06* (2006.01)

(52) U.S. Cl.
CPC ......... *C01B 33/10763* (2013.01); *B01J 23/72* (2013.01); *B01J 23/755* (2013.01); *C01B 33/06* (2013.01)

(58) Field of Classification Search
CPC .... B01J 23/72; B01J 23/755; C01B 33/10763
See application file for complete search history.

(56) References Cited

U.S. PATENT DOCUMENTS

| | | | |
|---|---|---|---|
| 4,070,444 A * | 1/1978 | Ingle | ...... C01B 33/02 136/258 |
| 4,526,769 A | 7/1985 | Ingle | |
| 4,684,741 A | 8/1987 | Prud'Homme | |

(Continued)

FOREIGN PATENT DOCUMENTS

| CN | 1157259 | 8/1997 |
|---|---|---|
| CN | 102325722 | 1/2012 |

(Continued)

OTHER PUBLICATIONS

PCT Search Report & Written Opinion, Patent Cooperation Treaty, Application No. PCT/KR2015/007573, dated Oct. 27, 2018.
(Continued)

*Primary Examiner* — Ngoc-Yen M Nguyen
(74) *Attorney, Agent, or Firm* — Lex IP Meister, PLLC

(57) ABSTRACT

Provided is a method of preparing trichlorosilane, more particularly, a method of preparing trichlorosilane which trichlorosilane can be obtained with an improved yield using a catalyst-supported silicon.

9 Claims, 1 Drawing Sheet

(56) References Cited

U.S. PATENT DOCUMENTS

| | | | |
|---|---|---|---|
| 5,061,672 A | | 10/1991 | Elattar |
| 5,160,720 A | * | 11/1992 | Halm ................ C01B 33/10742 423/342 |
| 5,250,716 A | | 10/1993 | Mui |
| 5,716,590 A | * | 2/1998 | Roewer .................... A62D 3/37 423/342 |
| 6,057,469 A | | 5/2000 | Margaria |
| 6,156,380 A | | 12/2000 | Aramata |
| 6,215,012 B1 | | 4/2001 | Ueno |
| 6,242,629 B1 | | 6/2001 | Ueno |
| 6,288,258 B1 | | 9/2001 | Aramata |
| 6,395,917 B1 | | 5/2002 | Ishizaka |
| 6,727,376 B2 | | 4/2004 | Ueno |
| 6,768,018 B2 | | 7/2004 | Furuya |
| 7,420,075 B2 | | 9/2008 | Aramata |
| 7,754,175 B2 | | 7/2010 | Bill |
| 2005/0074387 A1 | | 4/2005 | Bulan |
| 2011/0303874 A1 | * | 12/2011 | Dold .................... C01B 33/027 252/372 |
| 2013/0142722 A1 | | 6/2013 | Hoel |
| 2013/0156676 A1 | | 6/2013 | Katsoulis |
| 2015/0329367 A1 | | 11/2015 | Kim et al. |
| 2016/0101983 A1 | | 4/2016 | Kim et al. |

FOREIGN PATENT DOCUMENTS

| | | |
|---|---|---|
| DE | 19654154 | 6/1997 |
| EP | 0028009 | 5/1985 |
| EP | 0658359 | 6/1995 |
| EP | 2179965 | 4/2010 |
| JP | 56-073617 | 6/1981 |
| JP | 60-036318 | 2/1985 |
| JP | 63-100015 | 5/1988 |
| JP | 01-313318 | 12/1989 |
| JP | 09-235114 | 9/1997 |
| JP | 2000-176296 | 6/2000 |
| JP | 3755566 | 3/2006 |
| KR | 10-2008-0008323 | 1/2008 |
| KR | 10-2013-0105618 | 9/2013 |
| TW | 200704589 | 2/2007 |
| WO | 2006-098722 | 9/2006 |

OTHER PUBLICATIONS

EPO, Extended Search Report (ESR) of the corresponding European Patent Application No. 15825589.3, dated Feb. 22, 2018.

* cited by examiner

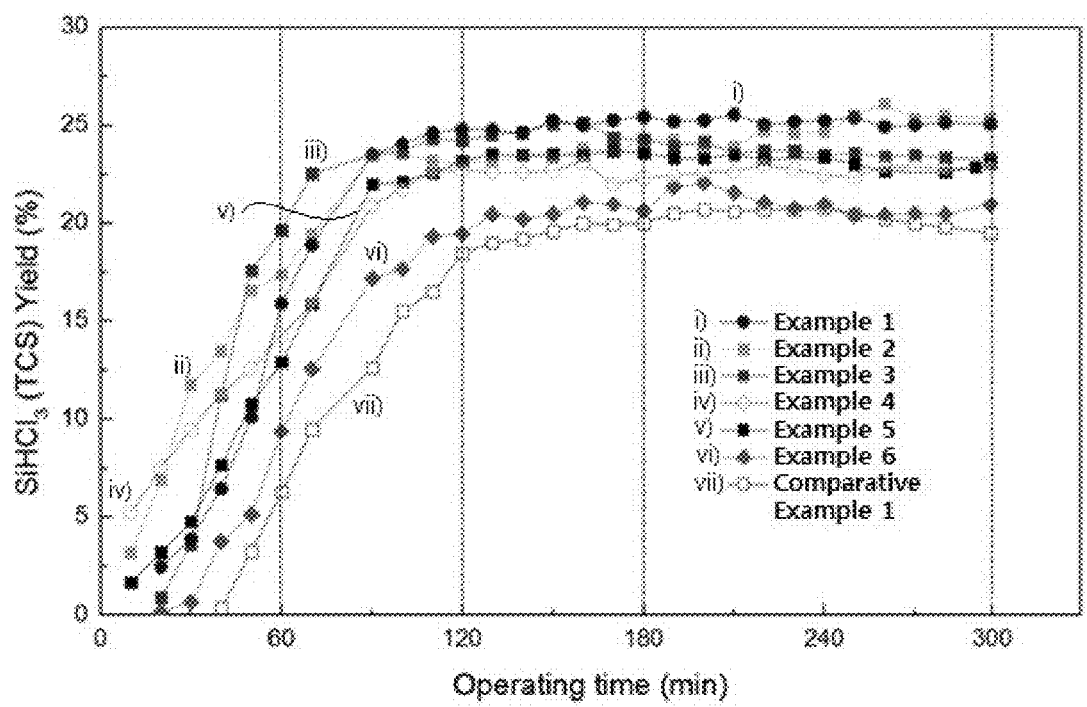

METHOD OF PREPARING TRICHLOROSILAN

BACKGROUND OF THE INVENTION (a) Field of the Invention

The present disclosure relates to a method of preparing trichlorosilane, and more particularly, to a method of preparing trichlorosilane which trichlorosilane can be obtained with an improved yield using a catalyst-supported silicon.

(b) Description of the Related Art

Trichlorosilane (TCS) is one of the main materials for preparing silicon for use in a semiconductor or a solar cell. For a method for preparation of trichlorosilane, direct chlorination and hydrochlorination (HC) are commercially utilized. Hydrochlorination is performed by supplying silicon tetrachloride (STC) and hydrogen ($H_2$) to metallurgical silicon (MG-Si) under conditions of a temperature of 500 to 600° C. and a pressure of 20 to 30 bar.

Various methods have been proposed to increase the reaction rate of hydrochlorination. Japanese Patent Laid-Open NOs. Showa56-73617 and Showa60-36318 disclose a method of adding a copper (Cu) catalyst, and Japanese Patent Laid-Open No. Showa63-100015 discloses a method of adding a Cu mixture to the reaction.

However, a copper catalyst contributes to an increase in the yield of trichlorosilane in a fixed bed reactor, but exhibits low contribution to a commercial process because copper particles may aggregate due to the small particle size thereof and collision of metallurgical silicon particles causes a loss of the catalyst on the surface thereof in a fluidized bed reactor.

In order to solve these problems, although a variety of attempts have been made to support a copper catalyst on the surface of metallurgical silicon as in Japanese Patent No. 3708649 and Korean Patent Application No. 2007-7023115, they are problematic in that the preparation process is complicated and the reaction time increases to deteriorate the catalytic activity.

SUMMARY OF THE INVENTION

In order to solve the problems of the prior art, an object of the present invention is to provide a method of preparing trichlorosilane which trichlorosilane can be obtained with an improved yield using a catalyst-supported metallurgical silicon.

In order to achieve the above object, the present invention provides a method of preparing trichlorosilane, including:

supporting a first metal catalyst in metallurgical silicon (MG-Si);

supplying silicon tetrachloride and hydrogen to the first metal catalyst-supported metallurgical silicon to conduct a hydrochlorination reaction.

According to a method of preparing trichlorosilane of the present invention, when metallurgical silicon having a catalyst supported therein is used to conduct a hydrochlorination reaction, the hydrochlorination reaction proceeds without a reduction in a catalytic activity over reaction time, thereby improving an yield of trichlorosilane.

BRIEF DESCRIPTION OF THE DRAWINGS

FIG. 1 is a graph showing the yields of trichlorosilane ($SiHCl_3$) according to the reaction time in Examples 1 to 6 and Comparative Example 1.

DETAILED DESCRIPTION OF THE EMBODIMENTS

As used herein, the terms "a first, a second and the like" are used to explain various constitutional elements, and the terms are used only to distinguish one constitutional element from the other constitutional elements.

Further, the terms used herein are used only to explain illustrative examples, and are not intended to limit the invention. A singular expression includes a plural expression unless otherwise means clearly. As used herein, the terms "comprise", "include", or "have" designate that described characteristics, numbers, steps, constitutional elements or combinations thereof are exist, but it should be understood that they do not previously exclude the possibility of existence or adding of one or more other characteristics, numbers, steps, constitutional elements or combinations thereof.

Also, as used herein, in case a layer or an element is mentioned to be formed "on" layers or elements, it means that the layer or element is directly formed on the layers or elements, or it means that other layers or elements may be additionally formed between the layers, on a subject, or on a substrate.

Although the present invention may have various forms and various modifications may be made thereto, specific examples will be exemplified and explained in detail. However, it is not intended to limit the present invention to disclosed forms, and it should be understood that all the modifications, equivalents or substitutions within the idea and technical scope of the present invention are included in the present invention.

Hereinafter, a method of preparing trichorosilane of the present invention will be described in detail.

A method of preparing trichlorosilane of the present invention include the steps of supporting a first metal catalyst in metallurgical silicon (MG-Si); and supplying silicon tetrachloride and hydrogen to the first metal catalyst-supported metallurgical silicon to conduct a hydrochlorination reaction.

As the method of preparing trichorosilane, a direct chlorination reaction and a hydrochlorination (HC) reaction are commercially used.

The hydrochlorination reaction is a process of reacting metallurgical silicon with silicon tetrachloride (STC) and hydrogen ($H_2$) to produce trichlorosilane at a high temperature and a high pressure, and the overall reaction is as shown in the following Formula 1.

$3SiCl_4 + 2H_2 + MG\text{-}Si \rightarrow 4SiHCl_3$      [Formula 1]

The overall reaction of Formula 1 may be divided into two steps of reactions as follows:

$SiCl_4 + H_2 \rightarrow SiHCl_3 + HCl$      [Formula 2]

$3HCl + Si \rightarrow SiHCl_3 + H_2$      [Formula 3]

The reaction is an endothermic reaction with heat of reaction of $\Delta H = 37$ kcal/mol, and a fluidized bed reactor is commercially employed in order to increase a reaction area. It is known that if a metal such as copper is used as a catalyst in the hydrochlorination reaction, a reaction rate and selectivity may be increased. Thus, a method of introducing a copper compound such as CuCl or $CuCl_2$ into the reactor to produce trichlorosilane has been suggested, but in this case, there are various problems that flowability of the reaction may be lowered due to aggregation of copper particles and catalyst efficiency may be lowered.

Therefore, according to the present invention, instead of introducing a copper compound as a catalyst, a first metal catalyst is supported inside metallurgical silicon. A hydrochlorination reaction is conducted by supplying silicon tetrachloride and hydrogen to the first metal catalyst-supported metallurgical silicon, thereby preventing a problem that flowability is decreased due to aggregation of catalyst particles as the reaction proceeds. As described, when the metal catalyst is supported inside metallurgical silicon, high catalytic activity may be maintained even though hydrochlorination reaction proceeds, thereby improving efficiency of the hydrochlorination reaction. Also, there may be no loss in the fluidized bed, and improved catalytic activity may be also observed in a late reaction since binding affinity between silicon and catalyst is strong, compared to a simple mixture of the catalyst and silicon or binding of the catalyst only on the surface thereof.

Additionally, a second metal catalyst may be supported on the surface of the first metal catalyst-supported metallurgical silicon, and this method of supporting the metal catalyst inside and on the surface of metallurgical silicon is also included in the present invention.

The method of preparing trichlorosilane of the present invention will be described in more detail. First, the first metal catalyst is supported in metallurgical silicon (MG-Si). The first metal catalyst is mainly supported inside the metallurgical silicon, but not excluding the possibility of supporting of a part thereof on the surface of the metallurgical silicon. For example, about 90% by weight or more, about 95% by weight or more, or about 99% by weight or more of the total weight of the first metal catalyst may be supported inside metallurgical silicon, and the rest thereof may exist on the surface of metallurgical silicon.

The metallurgical silicon is not particularly limited so long as it is silicon of a grade that may be used for preparation of trichlorosilane, and metallurgical silicon (MG-Si) powder having an average particle size of, for example, about 10 to about 500 μm, and preferably about 50 to about 300 μm may be used, considering reaction efficiency and economy. Metallurgical silicon powder having a particle size which satisfies the above range may be obtained by pulverizing and classifying metallurgical silicon mass.

Also, metallurgical silicon may have a purity of about 98% or more, and preferably about 99% or more, but is not particularly limited thereto.

It is known that when copper or a copper-containing compound is added to metallurgical silicon in the hydrochlorination reaction, a reaction rate of trichlorosilane is improved to contribute to an increase in the yield. However, a copper compound has a problem in that the copper compound exhibits catalytic properties only on the surface of the metallurgical silicon when it is simply mixed with metallurgical silicon, and therefore, it contributes to an increase in the initial activity, but the activity is decreased over time. Further, collision between metallurgical silicon particles occurs in the fluidized bed reactor to cause a continuous loss of the catalyst on the surface, and thus its contribution to a commercial process is low.

In contrast, according to the present invention, trichlorosilane may be prepared without a reduction in the activity over the reaction time by using not a mixture of metallurgical silicon and the catalyst but a supported catalyst which is prepared by supporting the catalyst inside metallurgical silicon.

A catalyst being the same as or different from the catalyst supported inside the metallurgical silicon may be further supported on the surface of the metallurgical silicon. In this case, the activity of the metal catalyst supported on the surface of the metallurgical silicon may be increased at the beginning of the hydrochlorination reaction, and over reaction time, the metal catalyst supported inside the metallurgical silicon is exposed to outside to increase hydrochlorination reactivity. Therefore, the catalyst may continuously exhibit its activity even after the initial reaction. Preferably, a kind of the metal catalyst supported on the surface of the metallurgical silicon may be different from the catalyst supported inside the metallurgical silicon. If the metal catalyst supported on the surface of the metallurgical silicon is different from the catalyst supported inside the metallurgical silicon, the metal catalyst supported on the surface of the metallurgical silicon functions as a main catalyst, and the catalyst supported inside thereof functions as a cocatalyst, thereby further increasing the catalytic activity.

According to an embodiment of the present invention, the step of supporting the first metal catalyst in the metallurgical silicon may be performed by injecting a precursor compound of the first metal catalyst into the melted metallurgical silicon to transit the first metal catalyst inside the metallurgical silicon.

To more effectively transit the first metal catalyst inside the metallurgical silicon, the precursor compound of the first metal catalyst may be injected into the metallurgical silicon at a temperature higher than a melting point of the metallurgical silicon, for example, at a temperature of about 1400° C. or higher. Thereafter, it is preferable that heat treatment may be maintained for a predetermined time, for example, for about 1 to about 12 hours, in order to secure a time sufficient to permeate the first metal catalyst into the metallurgical silicon. Next, while the temperature is decreased to room temperature, the metal atoms of the first metal catalyst penetrate and remain in the lattice or grain boundary of the metallurgical silicon. The amount of the metal atom to be incorporated into the silicon lattice is restricted, and thus most of the metal atoms exist at the grain boundary. As the hydrochlorination reaction proceeds, the grain boundary where the first metal catalysts are concentrated is exposed to the outside, and therefore, the first metal catalyst supported inside the metallurgical silicon exhibit its catalytic activity.

The first metal catalyst may be copper (Cu), nickel (Ni), iron (Fe), aluminium (Al), cobalt (Co), platinum (Pt), gold (Au), ruthenium (Ru), or palladium (Pd), but is not limited thereto.

If the first metal catalyst is copper, the precursor compound may be cuprous chloride (CuCl), cupric chloride ($CuCl_2$), cuprous oxide ($Cu_2O$), cupric oxide (CuO), metal copper (Cu), or a mixture thereof, but the present invention is not limited thereto.

If the first metal catalyst is nickel, the precursor compound may be nickel chloride ($NiCl_2$), nickel oxide (NiO, $Ni_2O_3$), metal nickel (Ni), or a mixture thereof, but the present invention is not limited thereto.

According to an embodiment of the present invention, the content of the first metal catalyst supported in the metallurgical silicon may be about 0.01 to about 10% by weight, preferably about 0.01 to about 1% by weight, and more preferably about 0.01 to about 1% by weight, relative to the total weight of the metallurgical silicon. As the content of the first metal catalyst is increased, the yield of trichlorosilane is generally increased, but the content within the above range is sufficient for yield improvement, in terms of the commercial and economic aspects.

Next, hydrochlorination reaction is conducted by supplying silicon tetrachloride and hydrogen to the first metal catalyst-supported metallurgical silicon.

According to an embodiment of the present invention, silicon tetrachloride and hydrogen may be supplied at a molar ratio of about 1:5 to about 1:2.

The hydrochlorination reaction may be conducted at a temperature of about 300 to about 800° C., and preferably, about 500 to about 700° C., and at a pressure of about 1 to about 50 bar, and preferably, about 5 to about 30 bar.

During the hydrochlorination reaction, trichlorosilane may be prepared in a high yield by the first metal catalyst supported in the metallurgical silicon.

According to an embodiment of the present invention, a step of supporting a second metal catalyst on the first metal catalyst-supported metallurgical silicon may be further included.

More specifically, the first metal catalyst-supported metallurgical silicon and a precursor compound of the second metal catalyst are mixed, and then the mixture is heated to a temperature higher than a melting point of the precursor compound of the second metal catalyst, thereby supporting the second metal catalyst on the surface of the metallurgical silicon. In this regard, the second metal catalyst may bind with silicon on the surface of the metallurgical silicon, and they may exist in the form of metal-silicide.

The second metal catalyst may be copper (Cu), nickel (Ni), iron (Fe), aluminium (Al), cobalt (Co), platinum (Pt), gold (Au), ruthenium (Ru), or palladium (Pd), but is not limited thereto.

If the second metal catalyst is copper, the precursor compound may be cuprous chloride (CuCl), cupric chloride ($CuCl_2$), cuprous oxide ($Cu_2O$), cupric oxide (CuO), metal copper (Cu), or a mixture thereof, but the present invention is not limited thereto.

If the second metal catalyst is nickel, the precursor compound may be nickel chloride ($NiCl_2$), nickel oxide (NiO, $Ni_2O_3$), metal nickel (Ni), or a mixture thereof, but the present invention is not limited thereto.

According to an embodiment of the present invention, the content of the second metal catalyst supported on the surface of the metallurgical silicon may be about 0.01 to about 20% by weight, preferably about 0.01 to about 10% by weight, and more preferably about 0.01 to about 1% by weight, relative to the total weight of the metallurgical silicon. As the content of the second metal catalyst is increased, the yield of trichlorosilane is generally increased, but the content within the above range is sufficient for yield improvement, in terms of the commercial and economic aspects.

The step of supporting the second metal catalyst on the surface of the metallurgical silicon may be performed by heat treatment at a temperature higher than a melting point of the precursor compound of the second metal catalyst. For example, the second metal catalyst may be supported on the surface of metallurgical silicon by heating at a temperature of about 300 to about 800° C., preferably about 300 to about 700° C. under atmospheric pressure, thereby preparing metal-silicide. More specifically, for example, if the precursor compound of the second metal catalyst is cupric chloride ($CuCl_2$), it is melted at about 400° C., and if the precursor compound of the second metal catalyst is nickel chloride ($NiCl_2$), it is melted at about 500° C. or higher, and as a result, it reacts with the silicon surface to form metal-silicide. Meanwhile, since the melting point of the precursor compound of the second metal catalyst may vary depending on the process conditions such as a kind of the precursor compound, a pressure during heat treatment, and gas atmosphere, the heat treatment conditions of the present invention are not limited to the above temperature range.

Further, the pressure condition may be, but is not particularly limited to, about 1 to about 20 bar, and preferably, about 1 to about 5 bar.

Further, the step of supporting the second metal catalyst on the surface of the metallurgical silicon may be performed under a gas mixture atmosphere containing hydrogen.

According to an embodiment of the present invention, the gas mixture contains hydrogen of about 10% by weight or less, for example, about 1 to about 10% by weight, and inert gas such as argon (Ar) or nitrogen ($N_2$) at a residual amount. As described above, when heat treatment is performed under a gas mixture atmosphere containing hydrogen, a natural oxide film is removed from the surface of metallurgical silicon, before formation of the second metal catalyst on the surface, making it easier to support the second metal catalyst. However, if an excessive amount of hydrogen is contained, the number of silicon-hydrogen bonds may increase. Hence, hydrogen is preferably contained in an amount of 10% or less with a residual amount of inert gas.

By the heat treatment process, the second metal catalyst is supported on the surface of metallurgical silicon, and the second metal catalyst may exist in the form of metal-silicide.

According to an embodiment of the present invention, as the metal-silicide is formed, a plurality of fine holes with a diameter of about 0.1 to about 10 μm, preferably about 1 to about 5 μm may be generated on the silicon surface. Due to the holes on the silicon surface, the surface area of the silicon may be increased to further improve reactivity.

According to an embodiment of the present invention, the step of supporting the second metal catalyst and the step of conducting a hydrochlorination reaction may be serially conducted. That is, the second metal catalyst is supported on the surface of the metallurgical silicon by the above described heat treatment in a reactor in which the first metal catalyst-supported metallurgical silicon and the precursor compound of the second metal catalyst are introduced, and into the same reactor, silicon tetrachloride and hydrogen may be serially supplied to conduct the hydrochlorination reaction.

According to another embodiment of the present invention, the step of supporting the second metal catalyst and the step of conducting the hydrochlorination reaction may be conducted at the same time. That is, the first metal catalyst-supported metallurgical silicon, the precursor compound of the second metal catalyst, silicon tetrachloride, and hydrogen are introduced into a reactor, and heat treatment is performed once, thereby supporting the second metal catalyst on the surface of the metallurgical silicon and conducting the hydrochlorination reaction at the same time. Thus, the reaction steps may become simpler and the operating time may be shortened.

According to the preparation method of the present invention, about 20% or more of yield improvement may be expected, compared to the case where a metal catalyst is introduced during the hydrochlorination process, separately from silicon.

Hereinafter, the actions and effects of the present invention will be described in more detail with reference to the specific Examples. However, these examples are illustrative only and the scope of the invention is not limited thereto.

EXAMPLE

Example 1

Metallurgical silicon having a purity of 99% or more was mixed with copper metal in a content of 0.1% by weight based on the weight of copper (Cu), relative to the total weight of metallurgical silicon, and this mixture was introduced into a heating furnace and melted by elevating the temperature to 1500° C. It was maintained at this temperature for 5 hours, and then cooled to room temperature. The cooled metallurgical silicon was pulverized to have an average particle size of 250 μm. The element analysis of metallurgical silicon was performed by ICP, and as a result, it was observed that copper was supported inside metallurgical silicon without loss of copper.

In a fluidized bed reactor, 170 g of metallurgical silicon having 0.1% by weight of copper supported therein and $NiCl_2$ in a content of 0.5% by weight based on the weight of nickel (Ni), relative to the total weight of metallurgical silicon were introduced, and then hydrochlorination was carried out for 5 hrs under conditions of a temperature of 525° C., a pressure of 20 barG, and a molar ratio of $H_2:SiCl_4=2:1$, yielding trichlorosilane.

Example 2

Metallurgical silicon having a purity of 99% or more was mixed with nickel metal in a content of 0.1% by weight based on the weight of nickel (Ni), relative to the total weight of metallurgical silicon, and this mixture was introduced into a heating furnace and melted by elevating the temperature to 1500° C. It was maintained at this temperature for 5 hours, and then cooled to room temperature. The cooled metallurgical silicon was pulverized to have an average particle size of 250 μm. The element analysis of metallurgical silicon was performed by ICP, and as a result, it was observed that nickel was supported inside metallurgical silicon without loss of nickel.

In a fluidized bed reactor, 170 g of metallurgical silicon having 0.1% by weight of nickel supported therein and $CuCl_2$ in a content of 0.5% by weight based on the weight of copper (Cu), relative to the total weight of metallurgical silicon were introduced, and then hydrochlorination was carried out for 5 hrs under conditions of a temperature of 525° C., a pressure of 20 barG, and a molar ratio of $H_2:SiCl_4=2:1$, yielding trichlorosilane.

Example 3

Metallurgical silicon having a purity of 99% or more was mixed with copper metal in a content of 0.1% by weight based on the weight of copper (Cu), relative to the total weight of metallurgical silicon, and this mixture was introduced into a heating furnace and melted by elevating the temperature to 1500° C. It was maintained at this temperature for 5 hours, and then cooled to room temperature. The cooled metallurgical silicon was pulverized to have an average particle size of 250 μm. The element analysis of metallurgical silicon was performed by ICP, and as a result, it was observed that copper was supported inside metallurgical silicon without loss of copper.

In a fluidized bed reactor, 170 g of metallurgical silicon having 0.1% by weight of copper supported therein and $CuCl_2$ in a content of 0.5% by weight based on the weight of copper (Cu), relative to the total weight of metallurgical silicon were introduced, and then hydrochlorination was carried out for 5 hrs under conditions of a temperature of 525° C., a pressure of 20 barG, and a molar ratio of $H_2:SiCl_4=2:1$, yielding trichlorosilane.

Example 4

Metallurgical silicon having a purity of 99% or more was mixed with nickel metal in a content of 0.1% by weight based on the weight of nickel (Ni), relative to the total weight of metallurgical silicon, and this mixture was introduced into a heating furnace and melted by elevating the temperature to 1500° C. It was maintained at this temperature for 5 hours, and then cooled to room temperature. The cooled metallurgical silicon was pulverized to have an average particle size of 250 μm. The element analysis of metallurgical silicon was performed by ICP, and as a result, it was observed that nickel was supported inside metallurgical silicon without loss of nickel.

In a fluidized bed reactor, 170 g of metallurgical silicon having 0.1% by weight of nickel supported therein and $NiCl_2$ in a content of 0.5% by weight based on the weight of nickel (Ni), relative to the total weight of metallurgical silicon were introduced, and then hydrochlorination was carried out for 5 hrs under conditions of a temperature of 525° C., a pressure of 20 barG, and a molar ratio of $H_2:SiCl_4=2:1$, yielding trichlorosilane.

Example 5

Metallurgical silicon having a purity of 99% or more was mixed with copper metal in a content of 0.1% by weight based on the weight of copper (Cu), relative to the total weight of metallurgical silicon, and this mixture was introduced into a heating furnace and melted by elevating the temperature to 1500° C. It was maintained at this temperature for 5 hours, and then cooled to room temperature. The cooled metallurgical silicon was pulverized to have an average particle size of 250 μm. The element analysis of metallurgical silicon was performed by ICP, and as a result, it was observed that copper was supported inside metallurgical silicon without loss of copper.

In a fluidized bed reactor, 170 g of metallurgical silicon having 0.1% by weight of copper supported therein was introduced, and then hydrochlorination was carried out for 5 hrs under conditions of a temperature of 525° C., a pressure of 20 barG, and a molar ratio of $H_2:SiCl_4=2:1$, yielding trichlorosilane.

Example 6

Metallurgical silicon having a purity of 99% or more was mixed with nickel metal in a content of 0.1% by weight based on the weight of nickel (Ni), relative to the total weight of metallurgical silicon, and this mixture was introduced into a heating furnace and melted by elevating the temperature to 1500° C. It was maintained at this temperature for 5 hours, and then cooled to room temperature. The cooled metallurgical silicon was pulverized to have an average particle size of 250 μm. The element analysis of metallurgical silicon was performed by ICP, and as a result, it was observed that nickel was supported inside metallurgical silicon without loss of nickel.

In a fluidized bed reactor, 170 g of metallurgical silicon having 0.1% by weight of nickel supported therein was introduced, and then hydrochlorination was carried out for 5 hrs under conditions of a temperature of 525° C., a pressure of 20 barG, and a molar ratio of $H_2:SiCl_4=2:1$, yielding trichlorosilane.

Comparative Example 1

In a fluidized bed reactor, 170 g of metallurgical silicon having a purity of 99% or more and an average particle size of 250 μm and having no catalyst therein was introduced, and then hydrochlorination was carried out for 5 hrs under conditions of a temperature of 525° C., a pressure of 20 barG, and a molar ratio of $H_2:SiCl_4=2:1$, yielding trichlorosilane.

Experimental Example

Measurement of Trichlorosilane Yield

The trichlorosilane ($SiHCl_3$) yields depending on the reaction time were measured in Examples 1 to 6 and Comparative Example 1, and the results are given in the following Table 1 and FIG. 1.

TABLE 1

| | Yield depending on reaction time (unit: %) | | | |
| --- | --- | --- | --- | --- |
| | 60 min | 120 min | 180 min | 300 min |
| Example 1 | 16.0 | 24.8 | 25.5 | 25.3 |
| Example 2 | 17.4 | 23.0 | 24.3 | 25.3 |
| Example 3 | 19.6 | 24.2 | 24.3 | 23 |
| Example 4 | 14.2 | 22.7 | 22.3 | 22.8 |
| Example 5 | 12.9 | 23.1 | 23.6 | 22.8 |
| Example 6 | 9.4 | 19.4 | 20.4 | 21.2 |
| Comparative Example 1 | 6.3 | 18.4 | 20 | 19.5 |

Referring to Table 1 and FIG. 1, it can be seen that when a hydrochlorination reaction was carried out using the first metal catalyst-supported metallurgical silicon according to Examples 1 to 6 of the present invention, the final yield was increased up to about 22%, compared to Comparative Example 1 in which a hydrochlorination reaction was carried out using only the metallurgical silicon.

Further, comparing the results between Examples 1 to 4, use of metallurgical silicon having the different catalysts inside and outside thereof showed about 11% increase in the yield, compared to use of metallurgical silicon having the same catalysts inside and outside thereof.

What is claimed is:
1. A method of preparing trichlorosilane, the method comprising:
supporting a first metal catalyst inside metallurgical silicon (MG-Si);
supporting a second metal catalyst on the metallurgical silicon; and
supplying silicon tetrachloride and hydrogen to the first and the second metal catalysts-supported metallurgical silicon to conduct a hydrochlorination reaction,
wherein the first metal catalyst is selected from the group consisting of copper (Cu), nickel (Ni), cobalt (Co), platinum (Pt), gold (Au), ruthenium (Ru), and palladium (Pd), and the second catalyst is selected from the group consisting of copper (Cu), nickel (Ni), cobalt (Co), platinum (Pt), gold (Au), ruthenium (Ru), and palladium (Pd), and
wherein the first and second metal catalysts are different from each other.

2. The method of claim 1, wherein the step of supporting the first metal catalyst inside the metallurgical silicon comprises the steps of injecting a precursor compound of the first metal catalyst into the metallurgical silicon at a temperature higher than a melting point of the metallurgical silicon; and decreasing the temperature to room temperature.

3. The method of claim 1, wherein the step of supporting the second metal catalyst on the metallurgical silicon and the step of conducting a hydrochlorination reaction are performed at the same time.

4. The method of claim 1, wherein the step of supporting the second metal catalyst on the metallurgical silicon is performed by mixing the first metal catalyst-supported metallurgical silicon with a precursor compound of the second metal catalyst, and then performing heat treatment at a temperature higher than a melting point of the precursor compound of the second metal catalyst.

5. The method of claim 1, wherein the first metal catalyst is supported in an amount of 0.01 to 10% by weight relative to the total weight of the metallurgical silicon.

6. The method of claim 1, wherein the second metal catalyst is supported in an amount of 0.01 to 20% by weight relative to the total weight of the metallurgical silicon.

7. The method of claim 1, wherein the metallurgical silicon has an average particle size of 10 to 500 μm.

8. The method of claim 1, wherein the step of conducting a hydrochlorination reaction is performed at a temperature of 300 to 800° C. and at a pressure of 1 to 50 bar.

9. The method of claim 1, wherein silicon tetrachloride and hydrogen are supplied at a molar ratio of 1:5 to 1:2 in the step of conducting a hydrochlorination reaction.

* * * * *